Patented May 28, 1940

2,202,219

UNITED STATES PATENT OFFICE 2,202,219

SUBSTITUTED SULPHANILAMIDES AND PROCESS FOR MAKING THEM

Fritz Mietzsch and Josef Klarer, Wuppertal-Elberfeld, Germany, assignors to Winthrop Chemical Company, Inc., New York, N. Y., a corporation of New York No Drawing. Application February 28, 1938, Serial No. 193,067. In Germany March 4, 1937

15 Claims. (Cl. 260—556)

This invention relates to therapeutically active benzene derivatives and to a process of preparing the same.

In accordance with the present invention new products which are distinguished by their therapeutic activity against ascarides infections of warm-blooded individuals are obtainable by the manufacture of the compounds of the general formula:

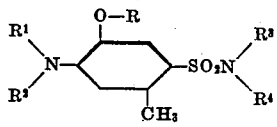

In this formula R stands for a lower alkyl group, such as methyl, ethyl, isopropyl, allyl, butyl and isobutyl or for a phenyl-lower alkyl or substituted phenyl-lower alkyl radical, such as benzyl, nitrobenzyl or aminobenzyl or chlorobenzyl, $R^1$ and $R^2$ stand for hydrogen atoms or for lower alkyl groups as specified above, $R^1$ may also stand for an acyl group, such as the formyl, acetyl and benzoyl group and $R^3$ and $R^4$ again stand for hydrogen atoms or for alkyl groups, such as methyl, ethyl, hydroxyethyl, allyl, isopropyl, butyl and isobutyl; $R^3$ and $R^4$ together may also stand for an alkylene group, so that they form with the nitrogen atom a saturated heterocyclic ring, for instance a pyrrolidine or piperidine ring. The said new products form white crystals which are sparingly soluble in water but dissolve in organic solvents and may be dissolved in aqueous alkali lyes if the sulphonamide group contains a hydrogen atom at the nitrogen atom.

The said new benzene derivatives are preferably prepared by reacting upon 1-acylamino- or 1-alkylamino-2-alkoxy- or 2-arylalkoxy-5-methylbenzenes with chlorosulphonic acid or a chlorosulphonic acid ester and converting the 1-acylamino- or alkylamino-2-alkoxy- or 2-arylalkoxy-5-methylbenzene-4-sulphonic acid chlorides or esters formed into the corresponding 4-sulphonamide compounds by reacting thereupon with ammonia, a primary or secondary amine, such as methylamine, dimethylamine, ethylamine, diethylamine, dihydroxyethylamine, diallylamine, dicrotylamine, diisopropylamine, butylamine, piperidine, etc. In the sulphonamide compounds thus formed the acyl group of the 1-acylamino group, for instance; the acetyl or benzoyl group may be finally split off by saponification with acids or alkalies.

It has further been found that the new compounds are also obtainable by reduction of 2-alkoxy- or 2-arylalkoxy-5-methylbenzene-4-sulphonamide-1-azo compounds or by reacting upon 1-halogen-2-alkoxy- or 2-arylalkoxy-5-methylbenzene-4-sulphonamides with ammonia, a primary or secondary amine.

The new products are also obtainable by producing an alkoxy- or arylalkoxy-group in the 2-position of 1-amino-, acylamino- or alkylamino-2-hydroxy-5-methylbenzene-4-sulphonamides by treating the said compounds with an alkylating or arylalkylating agent. The process is carried out in the presence of an acid binding agent.

Another method for the production of the new products is by reacting upon 1-amino-2-alkoxy- or 2-arylalkoxy-5-methyl-4-sulphonic acids or their reactive derivatives, such as esters and halides, in which products the 1-amino group may be substituted by acyl or alkyl, with ammonia, a primary or secondary amine. An acyl group present in the 1-amino group may be subsequently split off by saponification.

The invention is further illustrated by the following examples without being restricted thereto:

*Example 1.*—100 grams of 1-acetylamino-2-methoxy-5-methylbenzene (white crystals from benzene melting at 112° C.) are introduced into 300 ccs. of chlorsulphonic acid at 20° C. The mixture is then heated for 4 hours to 70° C. It is then poured into ice water while stirring and the precipitated 1-acetylamino-2-methoxy-5-methyl-benzene-4-sulphonic acid chloride filtered with suction. After recrystallization from aqueous acetone it forms colorless crystals melting at 135° C. For the transformation into the amide the still moist chloride which has been freed from excess mineral acid by washing is suspended in 400 ccs. of water and 400 ccs. of 20% aqueous ammonia and heated for 30 minutes at 60–70° C. while stirring. After cooling the 1-acetylamino-2-methoxy-5-methylbenzene-4-sulphonic acid amide is filtered with suction and purified by reprecipitation from caustic soda solution with ammonium chloride. After recrystallization from dilute alcohol white crystals melting at 234° C. are obtained. 50 grams of this compound are boiled with 250 ccs. of 16% hydrochloric acid while stirring until solution is complete. The hydrochloride of 1-amino-2-methoxy-5-methylbenzene-4-sulphonic acid amide crystallizing out on cooling is filtered with suction and transformed into the free base by means of sodium carbonate. The base forms colorless needles melting at 183° C. after recrystallization from dilute alcohol.

By using in the reaction with the 1-acetylamino-2-methoxy-5-methylbenzene-4-sulphonic acid chloride instead of ammonia primary or secondary amines and saponifying the acetyl group of the mono- or di-substituted sulphonic acid amides thus obtained, it is possible to obtain the 1-amino-2-methoxy-5-methylbenzene-4-sulphonic acid-monomethylamide melting at 139° C., the dimethylamide melting at 128° C., the diethylamide melting at 124° C., the monobutylamide melting at 97° C., and the hydroxyethylamide melting at 136° C.

By starting instead of from 1-acetylamino-2-methoxy-5-methylbenzene from 1-acetylamino-2-ethoxy-5-methylbenzene, 1-amino-2-ethoxy-5-methyl-benzene-4-sulphonic acid amide melting at 139° C., the monomethylamide melting at 167° C., the diethylamide melting at 92° C., and the hydroxyethylamide melting at 122° C. may be obtained.

*Example 2.*—15 grams of 1-amino-2-ethoxy-5-methylbenzene are dissolved in dilute hydrochloric acid and diazotized with 7 grams of sodium nitrite. The diazo solution is added to a hydrochloric acid solution of 11 grams of 3-toluidine and treated with sodium acetate. After coupling has taken place the mixture is rendered alkaline with ammonia, filtered with suction and recrystallized from dilute alcohol. The 2′.5-dimethyl-2-ethoxy-4′-aminoazobenzene forms yellow red crystals melting at 121° C. After acetylation with acetic anhydride the 2′.5-dimethyl-2-ethoxy-4′-acetylaminoazobenzene is obtained therefrom as a brick brown crystal powder melting at 157° C. (not sharp).

20 grams of the acetyl compound are introduced into 100 ccs. of chlorsulphonic acid at 20° C. and heated for 2 hours to 110° C. After cooling the red brown solution is poured on to ice, whereupon the 2′.5-dimethyl-2-ethoxy-4′-acetylaminoazobenzene-4-sulphochoride precipitates as a red brown precipitate. After filtering with suction and washing it is dissolved in acetone and introduced into aqueous ammonia solution. After heating for half an hour to 60–70° C. and distilling off the acetone the corresponding sulphonamide is obtained in the form of a yellow red powder which may be dissolved in caustic soda solution and reprecipitated with ammonium chloride and then melts at 208° C. For splitting up the azo compound 20 grams thereof are dissolved in excess aqueous caustic soda solution and treated with solid sodium hydrosulphite until the solution remains decolorized. After the addition of animal charcoal the solution is filtered with suction and treated with ammonium chloride, whereupon the 1-amino-2-ethoxy-5-methylbenzene-4-sulphonic acid amide precipitates which after recrystallization from dilute alcohol is obtained in colorless crystals melting at 139° C.

*Example 3.*—13.7 grams of 1-amino-2-methoxy-5-methylbenzene are diazotized in dilute sulphuric acid with 7 grams of sodium nitrite. The diazo solution is caused to run into a solution of 15 grams of cuprous bromide in concentrated hydrobromic acid (spec. grav. 1.5) at 40° C., whereupon the 1-bromo-2-methoxy-5-methylbenzene separates as an oil with the evolution of nitrogen. After separating and extracting with ether it is obtained as a colorless oil boiling at 103° C. under 5 mm. pressure. 50 grams of this compound are introduced into 200 ccs. of chlorsulphonic acid at 15–20° C., then heated for 2 hours at ordinary temperature and finally 1 hour on the water bath. After cooling the mixture is poured on to ice, whereupon the 1-bromo-2-methoxy-5-methylbenzene-4-sulphochloride precipitates in white crystals. After filtering with suction and washing it is introduced into aqueous ammonia solution and heated for 30 minutes to 50° C. The 1-bromo-2-methoxy-5-methylbenzene-4-sulphonic acid amide formed after filtration with suction is dissolved in dilute caustic soda solution and precipitated with ammonium chloride. From alcohol it is obtained in colorless crystals melting at 194° C. The product is heated with 20% aqueous ammonia solution in an autoclave while stirring for 12 hours at 190° C. and about 60 atmospheres pressure. The content of the autoclave is diluted with water and the 1-amino-2-methoxy-5-methylbenzene-4-sulphonic acid amide filtered with suction. After recrystallization from dilute alcohol the product is obtained in colorless crystals melting at 183° C. When reacting the 1-bromo-2-methoxy-5-methylbenzene-4-sulphonic acid amide instead of with ammonia with dimethylamine in the manner described above, the 1-dimethylamino-2-methoxy-5-methylbenzene-4-sulphonic acid amide, with diethylamine the 1-diethylamino-2-methoxy-5-methylbenzene-4-sulphonic acid amide is obtained.

*Example 4.*—16.5 grams of 1-acetylamino-2-hydroxy-5-methylbenzene are dissolved in water with the calculated quantity of caustic soda solution and stirred for several hours with 18 grams of 4-nitrobenzylchloride at 30–40° C. Thereby the 1-acetylamino-2-(4′-nitrobenzyloxy)-5-methylbenzene precipitates. It is filtered with suction and recrystallized from alcohol. In this manner colorless crystals melting at 176° C. are obtained. 50 grams of this compound are introduced into 250 ccs. of chlorsulphonic acid and heated for 4 hours to 70° C. The reaction solution shows a weak brown coloration. After cooling it is poured on to ice, whereupon the 1-acetylamino-2-(4′-nitrobenzyloxy)-5-methylbenzene-4-sulphochloride precipitates. It is dissolved in acetone and introduced into aqueous ammonia solution while stirring. With heating the acetone escapes. After heating for half an hour to 70° C. the sulphonic acid amide formed is filtered with suction and by repeated reprecipitation from caustic soda solution and ammonium chloride with the addition of animal charcoal it is obtained in the form of weakly yellow colored crystals melting above 250° C. By boiling with 20% caustic soda solution for half an hour the 1-amino-2-(4′-nitrobenzyloxy)-5-methylbenzene-4-sulphonic acid amide is obtained therefrom.

We claim:
1. The process which comprises reacting upon a compound of the formula:

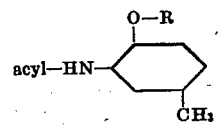

wherein R stands for a substituent selected from the group consisting of lower alkyl and phenyl-lower alkyl groups and of nitro-, amino- and halogen-substituted phenyl-lower alkyl groups and acyl stands for the radical of an acid selected from the group consisting of lower aliphatic and benzene carboxylic acids, with chlorosulphonic acid and reacting upon the sulphonic acid derivative formed with a compound selected from the group consisting of ammonia, lower aliphatic primary and secondary amines, pyrrolidine and piperidine.

2. The process which comprises reacting upon a compound of the formula:

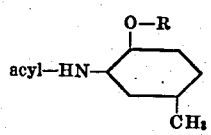

wherein R stands for a lower alkyl group and acyl stands for the radical of an acid selected from the group consisting of lower aliphatic and benzene carboxylic acids, with chlorosulphonic acid and reacting upon the sulphonic acid derivative formed with a compound selected from the group consisting of ammonia, lower aliphatic primary and secondary amines, pyrrolidine and piperidine.

3. The process which comprises reacting upon a compound of the formula:

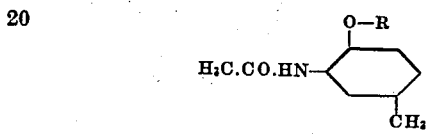

wherein R stands for a lower alkyl group, with chlorosulphonic acid and reacting upon the sulphonic acid derivative formed with a compound selected from the group consisting of ammonia, lower aliphatic primary and secondary amines, pyrrolidine and piperidine.

4. The process which comprises reacting upon 1-acetyl-amino-2-methoxy-5-methylbenzene with chlorosulphonic acid and reacting upon the sulphonic acid derivative formed with a compound selected from the group consisting of ammonia, lower aliphatic primary and secondary amines, pyrrolidine and piperidine.

5. The process which comprises reacting upon 1-acetylamino-2-methoxy-5-methylbenzene with chlorosulphonic acid and reacting upon the sulphochloride compound formed with ammonia.

6. Process as claimed in claim 5, in which the acetyl group of the 1-acetylamino-2-methoxy-5-methylbenzene-4-sulphonic acid amide formed is split off by saponification.

7. A product of the general formula:

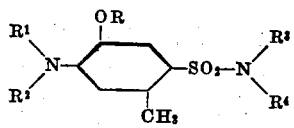

wherein R stands for a substituent selected from the group consisting of lower alkyl, phenyl-lower alkyl and nitro-, amino- and halogen-substituted phenyl-lower alkyl, R¹ stands for a substituent selected from the group consisting of hydrogen and the acyl radicals of lower aliphatic and phenyl carboxylic acids and R² stands for a substituent selected from the group consisting of hydrogen and lower alkyl, R³ and R⁴ stand for substituents selected from the group consisting of hydrogen, lower alkyl, lower hydroxy-alkyl and 4- to 5-membered alkylene in which latter case the alkylene radical stands for R³ and R⁴ together, which products form white crystals, are sparingly soluble in water and are active against ascarides.

8. A product of the general formula:

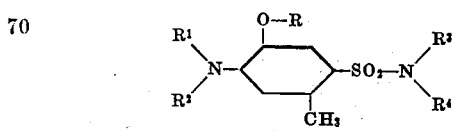

wherein R stands for lower alkyl, R¹ stands for a substituent selected from the group consisting of hydrogen and the acyl radicals of lower aliphatic and phenyl carboxylic acids and R² stands for a substituent selected from the group consisting of hydrogen and lower alkyl, R³ and R⁴ stand for substituents selected from the group consisting of hydrogen, lower alkyl, lower hydroxyalkyl and 4- to 5-membered alkylene, in which latter case the alkylene radical stands for R³ and R⁴ together, which products form white crystals, are sparingly soluble in water and are active against ascarides.

9. A product of the general formula:

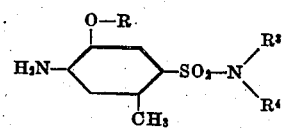

wherein R stands for a substituent selected from the group consisting of lower alkyl, phenyl-lower alkyl and nitro-, amino- and halogen-substituted phenyl-lower alkyl, R³ and R⁴ stand for substituents selected from the group consisting of hydrogen, lower alkyl, lower hydroxyalkyl and 4- to 5-membered alkylene, in which latter case the alkylene radical stands for R³ and R⁴ together, which products form white crystals, are sparingly soluble in water and are active against ascarides.

10. A product of the general formula:

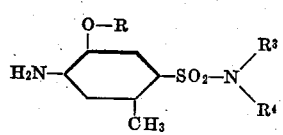

wherein R stands for lower alkyl, R³ and R⁴ stand for substituents selected from the group consisting of hydrogen, lower alkyl, lower hydroxyalkyl and 4- to 5-membered alkylene, in which latter case the alkylene radical stands for R³ and R⁴ together, which products form white crystals, are sparingly soluble in water and are active against ascarides.

11. A product of the general formula:

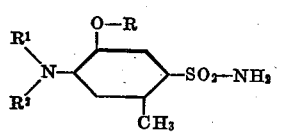

wherein R stands for a substituent selected from the group consisting of lower alkyl, phenyl-lower alkyl and nitro-, amino- and halogen-substituted phenyl-lower alkyl, R¹ stands for a substituent selected from the group consisting of hydrogen and the acyl radicals of lower aliphatic and phenyl carboxylic acids and R² stands for a substituent selected from the group consisting of hydrogen and lower alkyl, which products form white crystals, are sparingly soluble in water and are active against ascarides.

12. A product of the general formula:

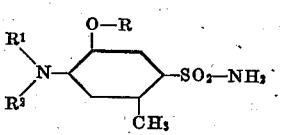

wherein R stands for lower alkyl, R¹ stands for a substituent selected from the group consisting of hydrogen and the acyl radicals of lower aliphatic and phenyl carboxylic acids, and R² stands for a substituent selected from the group consisting of hydrogen and lower alkyl, which products form white crystals, are sparingly soluble in water and are active against ascarides.

13. A product of the general formula:

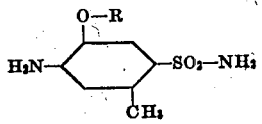

wherein R stands for a substituent selected from the group consisting of lower alkyl, phenyl-lower alkyl and nitro-, amino- and halogen-substituted phenyl-lower alkyl, which products form white crystals, are sparingly soluble in water and are active against ascarides.

14. 1-amino-2-lower alkoxy-5-methyl-benzene-4-sulphonamides, which products form white crystals, are sparingly soluble in water and are active against ascarides.

15. 1-amino-2-methoxy-5-methyl-benzene-4-sulphonamide, which product forms white crystals melting at 183° C. and is active against ascarides.

FRITZ MIETZSCH.
JOSEF KLARER.